US012654990B2

(12) United States Patent
Delattre

(10) Patent No.: US 12,654,990 B2
(45) Date of Patent: Jun. 16, 2026

(54) PROTECTION SYSTEM FOR ELEVATORS

(71) Applicant: PETRAL, Brussels (BE)

(72) Inventor: Pascal Delattre, Brussels (BE)

(73) Assignee: PETRAL, Brussels (BE)

( * ) Notice: Subject to any disclaimer, the term of this patent is extended or adjusted under 35 U.S.C. 154(b) by 68 days.

(21) Appl. No.: 18/718,349

(22) PCT Filed: Dec. 10, 2021

(86) PCT No.: PCT/EP2021/085245
§ 371 (c)(1),
(2) Date: Jun. 10, 2024

(87) PCT Pub. No.: WO2023/104318
PCT Pub. Date: Jun. 15, 2023

(65) Prior Publication Data

US 2025/0059002 A1 Feb. 20, 2025

(51) Int. Cl.
*B66B 11/02* (2006.01)
*B66B 7/06* (2006.01)
*B66B 17/12* (2006.01)

(52) U.S. Cl.
CPC ............ *B66B 11/0226* (2013.01); *B66B 7/06* (2013.01); *B66B 17/12* (2013.01)

(58) Field of Classification Search
CPC ........ B66B 7/06; B66B 17/12; B66B 11/0226
See application file for complete search history.

(56) References Cited

FOREIGN PATENT DOCUMENTS

| | | | | |
|---|---|---|---|---|
| CN | 106744177 A | * | 5/2017 | B66B 11/0226 |
| CN | 108249259 A | * | 7/2018 | B66B 11/0226 |
| CN | 108622774 A | * | 10/2018 | B66B 11/0226 |
| CN | 110371830 A | * | 10/2019 | F16F 15/04 |

(Continued)

OTHER PUBLICATIONS

Machine translation of CN 111170112.*

(Continued)

*Primary Examiner* — Diem M Tran
(74) *Attorney, Agent, or Firm* — Hanley, Flight & Zimmerman, LLC

(57) ABSTRACT

A movable element of an elevator like an elevator cabin or a counterweight, wherein the movable element comprising: a top side, a bottom side, a lateral side, a top edge between the lateral side and the top side, a bottom edge between the lateral side and the bottom side, a protective structure connected to the movable element via a shock-absorbing system holding the protective structure in an operating position and allowing the protective structure to move against the driving direction of the movable element, when the protective structure hits an object during driving of the elevator, wherein the protective structure has a top protective element which in the operating position is arranged above the top edge and is extending along the top edge, wherein the protective structure has a bottom protective element which in the operating position is arranged below the bottom edge and is extending along the bottom edge, and a collision detector for detecting when the protective structure is moved out of its operating position to detect a collision, wherein the collision detector is configured to initiate the stop of the movable element during its drive, when the collision is detected.

13 Claims, 4 Drawing Sheets

(56) References Cited

FOREIGN PATENT DOCUMENTS

| | | | | | |
|---|---|---|---|---|---|
| CN | 110436290 | A | | 11/2019 | |
| CN | 111170112 | A | | 5/2020 | |
| CN | 210558710 | U | * | 5/2020 | |
| CN | 111232802 | A | * | 6/2020 | ............. B66B 5/027 |
| CN | 111362107 | A | * | 7/2020 | ........... B66B 5/0018 |
| CN | 111847200 | A | * | 10/2020 | ............... A61L 2/10 |
| CN | 112141857 | A | * | 12/2020 | ......... B66B 11/0226 |
| CN | 112707268 | A | * | 4/2021 | ............... A47L 1/06 |
| CN | 112707283 | A | * | 4/2021 | ......... B66B 11/0246 |
| CN | 213011400 | U | | 4/2021 | |
| CN | 213864918 | U | | 8/2021 | |
| CN | 116424991 | A | * | 7/2023 | ............. B66B 5/284 |
| CN | 221565412 | U | * | 8/2024 | |
| EP | 3502034 | A1 | * | 6/2019 | ............... B66B 5/22 |
| KR | 101976607 | B1 | * | 5/2019 | ......... B66B 11/0226 |

OTHER PUBLICATIONS

Machine translation of CN 112707268.*
Machine translation of EP 3502034.*
International Searching Authority, "International Search Report," issued in connection with International Patent Application No. PCT/EP2021/085245, dated Jul. 18, 2022, 4 pages.
International Searching Authority, "Written Opinion," issued in connection with International Patent Application No. PCT/EP2021/085245, dated Jul. 18, 2022, 4 pages.

* cited by examiner

PROTECTION SYSTEM FOR ELEVATORS

CROSS-REFERENCE TO RELATED APPLICATION

This Patent arises from a US National Stage of International Application No. PCT/EP2021/085245, filed Dec. 10, 2021. Priority to International Application No. PCT/EP2021/085245 is hereby claimed. International Application No. PCT/EP2021/085245 is hereby incorporated by reference in its entirety.

TECHNICAL FIELD

The present invention relates to a movable element of an elevator like an elevator cabin or a counterweight, an elevator, a system for protecting an elevator and a method for retrofitting an elevator.

PRIOR ART

Most modern elevators are for safety reasons arranged in a shaft so that all movable elements of the elevator are not accessible from outside of the shaft during the drive of the elevator, i.e. while the movable elements of the elevator move. This avoids that persons can be damaged by invading the movement path of the elevator elements or that the elevator can be damaged by intruding objects.

However, there is a large number of historic and/or old elevators which do not fulfill these safety requirements and provide open portions which are accessible from the outside while the elevator is driving. For example, many historic elevators have grill gates instead of blind doors for protecting the entrance door of the elevator cabin. Thus, during the drive of the elevator, a person could invade the elevator movement path with its arm which could lead to injuries. Also, many historic elevators are built in a staircase without an enclosing shaft. Retrofitting a shaft enclosure around the elevator movement path might be problematic for technical reasons like its structural load or missing space. However, also esthetic and monument conservation reasons might block the installation of heavy elevator shafts. For these reasons many historic elevators must be replaced with modern elevators with a shaft, or its operation must be stopped.

There exist small elevators like proposed in CN213011400U, CN110436290 or CN111170112 which have a plate covering the top and the bottom surface of the cabin, which detects a resistance on the plate to stop the elevator or to avoid that it starts. However, such a solution is not adapted for historic or old elevators. These historic or old elevators have generally technical equipment and particular protrusions like for example the elevator cabin frame on the top and bottom of the elevator cabin. Thus, such an incorporated protection plate as suggested in the above documents could not be retrofitted on most existing elevators. In addition, most old and historic elevators require that a maintenance person is on the roof while the elevator is driving to check the correct functioning of the elevator and in particular of the safety system. This is not possible with the above-described plate. Finally, the above safety system does not assure a full protection against all object or person invasions into the elevator pathway.

BRIEF SUMMARY OF THE INVENTION

It is the object of the invention to increase the lifetime of existing elevators with open portions, to allow to re-establish the original form of historic elevators which have been already transformed or to allow also new elevators with open portions in the elevator pathway.

According to the invention, this object is solved by the movable element, the elevator, the system and the method according to the independent claims.

It is proposed to use a protective structure which protects the peripheral edges of the top and bottom side of the movable elements of the elevator, but which allows to have sufficient space that a maintenance person can step on the top side without removing the protective structure. This allows that the protection mechanism will work also during the maintenance and can thus be checked by the maintenance person for proper functioning. The current solution reduces also the visual impact of the protective structure and respects thus the historical and/or esthetical value of the elevator.

The dependent claims refer to further advantageous embodiments.

The electronic detector, for example a light curtain, configured to detect a penetration of an object through the surface spanned between the top edge and the bottom edge, the protective system protects not only the pathway of the elevator above and below the movable element, but also the zone of the movable element itself. Therefore, this system provides a full protection of the elevator for the movable element as also the envelope of the movable element is protected. An intrusion in the pathway of the movable element is detected also when the movable element is currently passing the opening. Preferably, the electronic detector is arranged on the protective structure and is configured to detect a penetration of an object through the surface spanned between the top protective element and the bottom protective element. This allows a complete protection of the elevator, as the top protective element protects against collisions with the top edge of the elevator cabin, the bottom protective element protects against collisions with the bottom edge of the elevator cabin and the electronic detector mounted on the protective structure allows to fill the protection gap in between completely.

The electronic detector, for example a light curtain, configured to detect a penetration of an object through the surface spanned between the top protective element and the bottom protective element, it can also be detected, if anything enters the pathway of the movable element between the top protective element and the bottom protective element. Since the electronic detector is mounted on the protective structure, there is no detection interruption between the top and the bottom protective element. An intrusion in the pathway of the movable element is detected also when the movable element is currently passing the opening.

By allowing sufficient suspension distance suspension distance of at least 2 cm or of the necessary distance to stop the movable element upon collision detection, the protective structure suspends the impact before the movable element is stopped.

Other embodiments according to the present invention are mentioned in the appended claims, the subsequent description.

BRIEF DESCRIPTION OF THE DRAWINGS

In the drawings, the same reference numbers have been allocated to the same or analogue element.

DETAILED DESCRIPTION OF AN EMBODIMENT OF THE INVENTION

Figure 1:
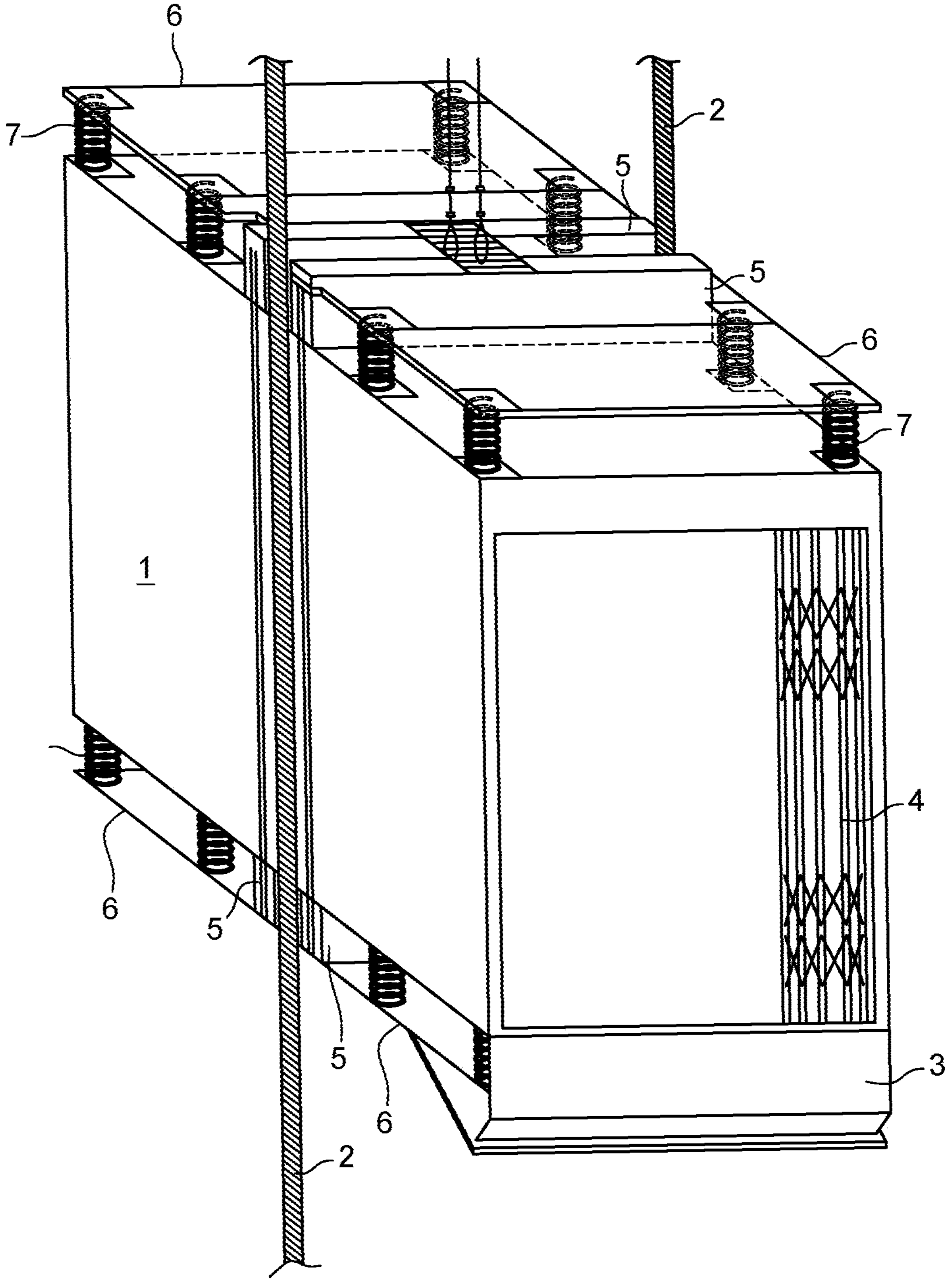
FIG. 1 is a perspective view of an elevator cabin with a first embodiment of the protective system according to the invention.

Other characteristics and advantages of the present invention will be derived from the non-limitative following description, and by making reference to the drawings and the examples.

An elevator comprises at least one movable element, an elevator lifting mechanism and an elevator pathway. The at least one movable element comprises the elevator cabin for transporting persons and/or goods. The at least one movable element comprises preferably also a counter-weight.

The elevator can be a person elevator for transporting humans. Such person elevators include control elements within the elevator cabin allowing the transported persons to select the floor they want to go. The elevator can also be a goods elevator for transporting (only non-human) objects. Such goods elevators do not have control elements within the elevator cabin allowing to select the floor from within the elevator cabin.

The elevator pathway is the pathway for the movable elements of the elevator. The pathway extends in the movement direction, preferably a vertical direction such that the movable element(s) can move in a vertical direction back and forth, preferably up and down. The pathway comprises preferably a plurality of entrance doors at different levels/floors of the pathway or the house in which the elevator is installed. In a preferred embodiment, the pathway is at least partly open. The open portions of the pathway allow an object to enter the pathway of the movable object so that this object could collide with the moving movable element. The object colliding with the movable element can be a non-human object or a (part of a) human body. Often the open portions are partly open meaning that a person cannot enter fully into the pathway but could enter with an arm or a rod into the pathway. Partly open portions are for example open portions which are closed by a grid or a grid door. Such a grid door is often installed at the entrances into the pathway at the different floors. The pathway is defined as the projection of the movable element into the movement direction of the movable element from the lowest point of the movable element in the pathway to the highest point of the movable element in the pathway. In other words, the pathway is defined as the three-dimensional space covered by the movable element in any elevation state of the elevator. Each movable element has a distinct pathway. For example, the elevator cabin can have a first pathway and the counter-weight can have a second pathway. The highest point of the first pathway can be or lower than the highest point of the second pathway. The pathway of the elevator is provided by the combination of the pathways of each movable element. In the subsequent description, the term pathway refers always to the movable element in question. The pathway comprises preferably guide means 2 to guide the movable elements into the designated pathway. The first pathway comprises guide means 2, preferably two rails 2, to guide the elevator cabin into the designated first pathway. However, there exists also elevators without guide means.

Figure 6:
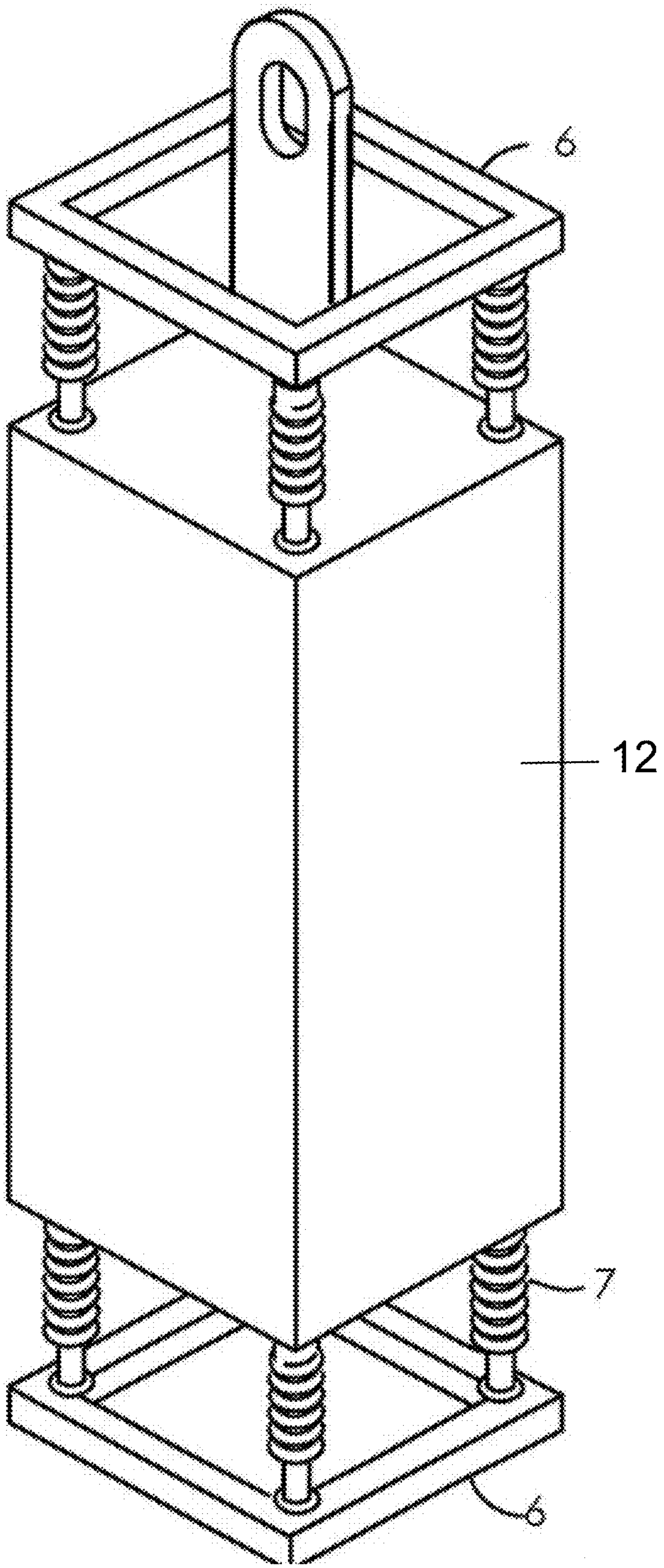
FIG. 6 is a perspective view of a counter weight with the first embodiment of the protective system according to the invention.

The elevator lifting mechanism is a mechanism for moving the elevator cabin in the pathway back and forth or up and down. The elevator lifting mechanism is preferably a cable drive. The cable drive comprises a motor and a cable. The cable suspends the elevator cabin on one end. The cable extends (in the first pathway) from the elevator cabin to the top of the elevator pathway and is guided back down (in the second pathway) to the counterweight 12 (see FIG. 6). The motor is configured to move the cable such that the elevator cabin moves up and down. However, other elevator lifting mechanism like hydraulic lifting mechanism could be used. In this case, the elevator cabin could be supported by a hydraulic piston moving the elevator cabin back and forth. Also, other lifting elevator mechanisms can be used.

An example of the elevator cabin is shown in FIG. 1. The elevator cabin comprises a top side, a bottom side and at least one lateral side. If the elevator cabin has a rectangular cross-section (perpendicular to the movement direction), the lateral side comprises preferably a first lateral side, a second lateral side, a third lateral side and a fourth lateral side. The first lateral side is opposed to the third lateral side. The second lateral side is opposed to the fourth lateral side. The elevator cabin comprises a top edge between the lateral side and the top side. The top edge refers to the peripheral edge of the elevator cabin on the top side. If the elevator cabin has a rectangular cross-section, the top edge comprises a first top edge between the first lateral side and the top side, a second top edge between the second lateral side and the top side, a third top edge between the third lateral side and the top side and a fourth top edge between the fourth lateral side and the top side. The elevator cabin comprises a bottom edge between the lateral side and the bottom side. The bottom edge refers to the peripheral edge of the elevator cabin on the bottom side. If the elevator cabin has a rectangular cross-section, the bottom edge comprises a first bottom edge between the first lateral side and the bottom side, a second bottom edge between the second lateral side and the bottom side, a third bottom edge between the third lateral side and the bottom side and a fourth bottom edge between the fourth lateral side and the bottom side. However, the elevator cabin can have any other cross-sectional form (perpendicular to the driving direction) like a circular form (one round lateral side), an ellipsoidal form (one round lateral side), a hexagonal form (six lateral sides), a polygonal form or any other form.

The elevator cabin comprises preferably a (support) cabin frame 5 configured to structurally connect the elevator cabin to the elevator lifting mechanism. The cabin box 1 of the elevator cabin is preferably hold in the cabin frame 5. The cabin box 1 allows to transport the persons and/or goods in it. The cabin frame 5 is preferably arranged in (the middle) between the first lateral side and the third lateral side. The cabin frame 5 extends preferably parallel to the first and/or third lateral side and/or perpendicular to the second and/or fourth lateral side. The cabin frame 5 has preferably a U- or O shape around the cabin box 1. Preferably, the cabin frame 5 extends preferably along at least three, preferably four of the top side, the second lateral side, the bottom side and the fourth lateral side. Preferably, the top side of the cabin frame 5 comprises a fixing means for the cables of the cable drive. The fixing means for the cables are preferably arranged in the center of the top side of the cabin frame 5.

The cabin frame 5 separates the elevator cabin in a first portion with a first portion lateral side, a first portion top side and a first portion bottom side and a second portion with second portion lateral side, a second portion top side and a second portion bottom side. The cabin frame 5 separates thus the second lateral side into a first portion second lateral side and a second portion second lateral side, the fourth lateral side into a first portion fourth lateral side and a second portion fourth lateral side, the top side into a first portion top side and a second portion top side, and/or the bottom side into a first portion bottom side and a second portion bottom side. Preferably, the first portion comprises the portion of the elevator cabin between the cabin frame 5 and the first lateral side, preferably also between the (first portion) second lateral side, the (first portion) fourth lateral side, the (first portion) top side and/or the (first portion) bottom side. Preferably, the second portion comprises the portion of the elevator cabin between the cabin frame 5 and the third lateral side, preferably also between the (second portion) second lateral side, the (second portion) fourth lateral side, the (second portion) top side and/or the (second portion) bottom side. The first portion top edge refers to the edge between the first portion top side and the first portion lateral side. The second portion top edge refers to the edge between the second portion top side and the second portion lateral side. The first portion bottom edge refers to the edge between the first portion bottom side and the first portion lateral side. The second portion bottom edge refers to the edge between the second portion bottom side and the second portion lateral side.

The elevator cabin, preferably the cabin frame 5 has generally guide means for the guide means 2 of the pathway. In the shown embodiment, the guide means of the elevator cabin is arranged the second and/or fourth lateral side of the elevator cabin or cabin frame 5.

The elevator cabin and/or the cabin box 1 comprises preferably an entrance into the cabin box 1. The entrance of the elevator cabin is arranged for example on the first lateral side. The entrance of the elevator cabin is arranged such that it corresponds to the entrance into the elevator/pathway in each floor, when the elevator cabin stops at the respective floor. The entrance of the elevator cabin is preferably closable by a closing means like a door. In the shown embodiment, the closing means is a grill gate 4. Preferably, the entrance comprises on the inner side of the closing means an inner electronic detector for detecting, if an object approaches from the inside of the cabin box 1 towards the closing means, e.g. the grill gate 4. The inner electronic detector can be a light curtain being arranged parallel to the closing means. The elevator cabin and/or cabin box 1 might have more than one entrance, e.g. at different lateral sides.

The elevator cabin has preferably a toe guard 3 on the bottom of the entrance of the elevator cabin. The toe guard 3 is preferably arranged on the (first) bottom edge of the elevator cabin in the prolongation of the elevator cabin.

The invention refers to a system for protecting elevator cabin (or other movable elements) of the elevator. The system can be easily retrofitted to existing elevators as described above but can also be implemented in new elevators.

The system comprises a protective structure 6, a shock-absorbing system 7 and a collision detector.

The protective structure is connected to the elevator cabin via the shock-absorbing system 7 holding the protective structure 6 in an operating position and allowing the protective structure 6 to move against the driving direction of the of the elevator cabin, when the protective structure 6 hits an object during driving of the elevator.

The protective structure 6 has a top protective element which in the operating position is arranged above the top edge and is extending along the top edge. This means that the top protective element is arranged such that a projection in the driving direction of the peripheral edge/side of the top protective element would correspond to the top edge of the of the elevator cabin. Thus, when the elevator cabin moves upwards and an object is in the pathway of the elevator cabin, the top protective element would hit the object before the object is hit by the top edge of the elevator cabin. Thus, the peripheral edge of the top protective element must (in the direction perpendicular to the driving direction and to the top edge direction) correspond at least to the (peripheral) top edge of the elevator cabin, preferably must (in the direction perpendicular to the driving direction and to the top edge direction) extend beyond the (peripheral) top edge.

The protective structure 6 has a bottom protective element which in the operating position is arranged below the bottom edge and is extending along the bottom edge. This means that the bottom protective element is arranged such that a projection in the driving direction of the peripheral edge/side of the bottom protective element would correspond to the bottom edge of the of the elevator cabin. Thus, when the elevator cabin moves downwards and an object is in the pathway of the elevator cabin, the bottom protective element would hit the object before the object is hit by the bottom edge of the elevator cabin. Thus, the peripheral edge of the bottom protective element must (in the direction perpendicular to the driving direction and to the bottom edge direction) correspond at least to the (peripheral) bottom edge of the elevator cabin, preferably must (in the direction perpendicular to the driving direction and to the bottom edge direction) extend beyond the (peripheral) bottom edge.

The protective structure 6 is designed such that it allows a person to stand on the top side of the elevator cabin without moving the protective structure 6 out of its operating position. This allows to install the protective structure 6 on historic elevators which require that a maintenance person stands on the roof of the elevator cabin while the elevator cabin is moving.

The protective structure 6 is preferably realized as a protective frame. The frame sides of the protective frame realize preferably the top protective element and the bottom protective elements. The protective frame is preferably realized with a frame width smaller than 20 cm, preferably smaller than 15 cm, preferably smaller than 10 cm, preferably 8 cm, preferably smaller than 5 cm, preferably smaller than 4 cm, preferably smaller than 3 cm, preferably smaller than 2 cm. The frame width is preferably as thin as possible, but allowing the necessary rigidity. Such a thin frame width reduces the visual impact of the protective frame 6 and increases the space available for the technician on the roof/top side of the elevator cabin. The frame width is the dimension of the frame perpendicular to the driving direction and perpendicular to the top edge (at the respective part of the frame). This allows a very light structure which reduces the impulse of the impact of the protective structure/frame 6 on an object or a human part. In addition, this keeps the central portion of the top side free so that maintenance persons stand on the top side during driving the elevator cabin.

The protective frame can be realized in many different ways as will be shown with the help of some examples. The protective frame can have a plurality of sub-frames. For independent sub-frames, each sub-frame is connected with a respective shock-absorbing sub-system to the elevator cabin. However, it is also possible that some or all sub-frames are connected to each other and connected via a common shock-absorbing system to the elevator cabin.

The shock-absorbing system 7 is configured to holding the protective structure 6 in an operating position and allowing the protective structure 6 to move against the driving direction of the movable element.

FIG. 1 shows a first embodiment of the protective frame 6. The protective frame 6 comprises a top protective frame and a bottom protective frame. The top protective frame is arranged on the top side of the elevator cabin and extends along the top edge of the elevator cabin to form the top protective element. The bottom protective frame is arranged on the bottom side of the elevator cabin and extends along the bottom edge of the elevator cabin to form the bottom protective element.

Figure 2:
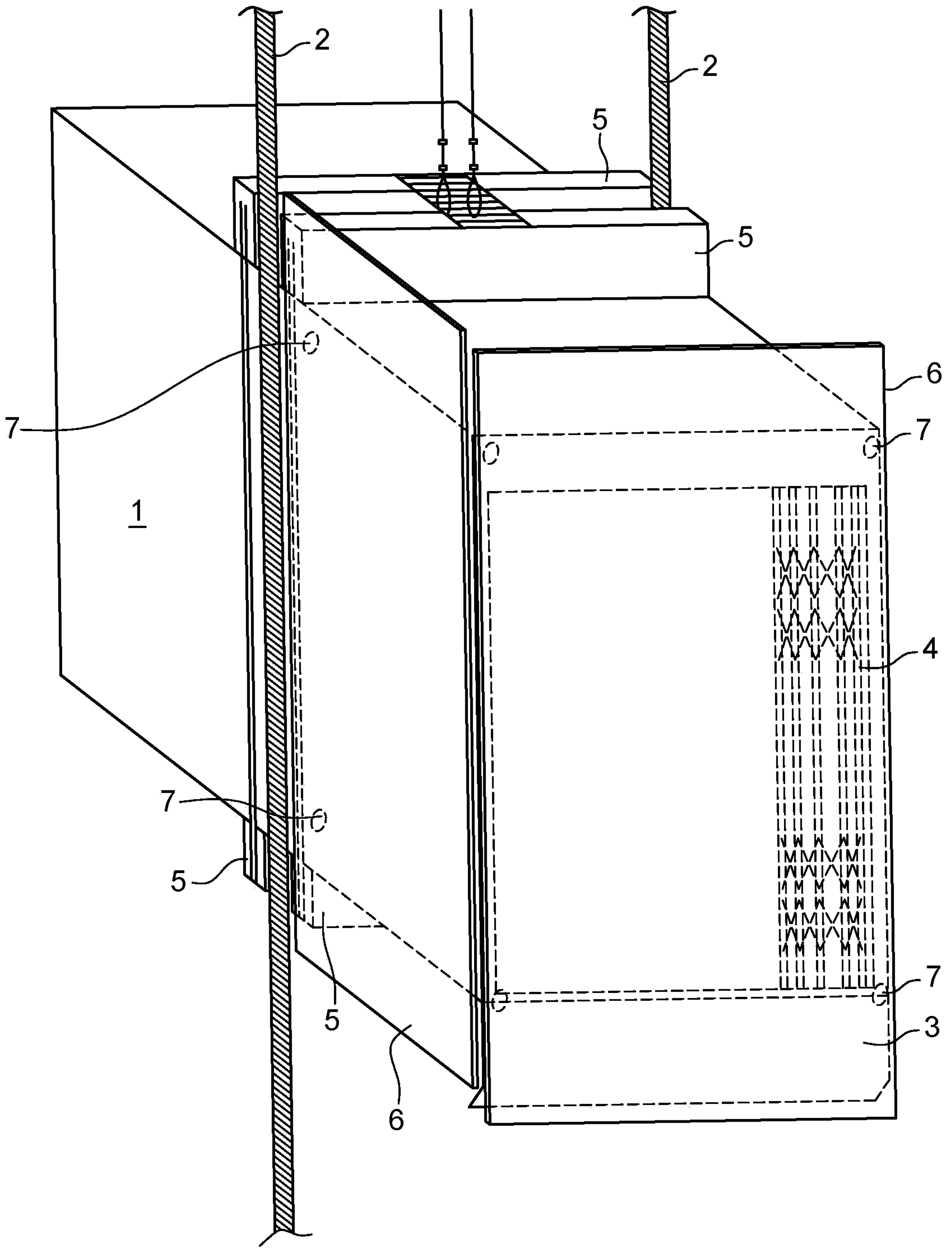
FIG. 2 is a perspective view of an elevator cabin with a second embodiment of the protective system according to the invention.
Figure 3:
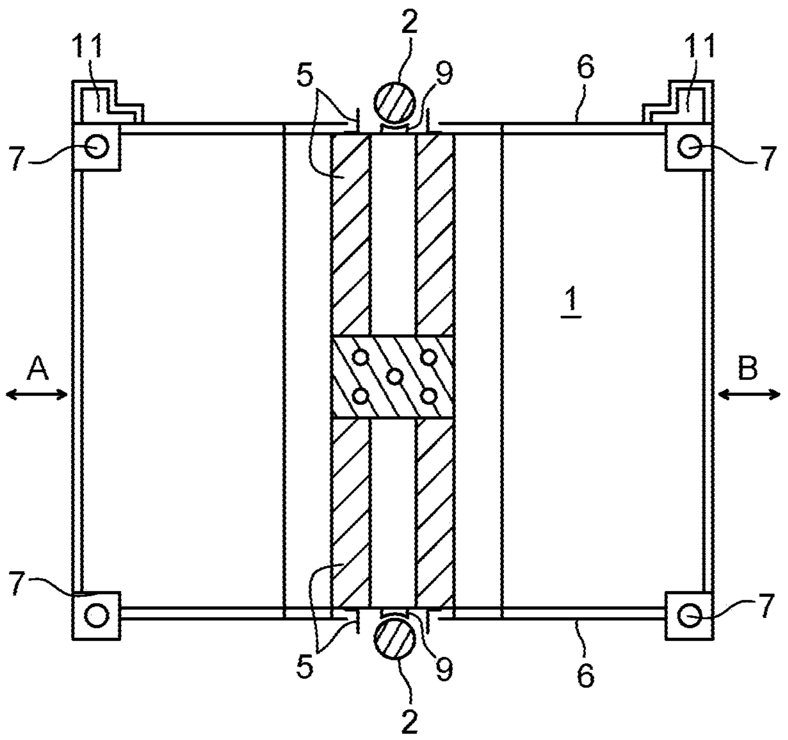
FIG. 3 is a top view of the elevator cabin with the first embodiment of the protective system according to the invention.
Figure 4:
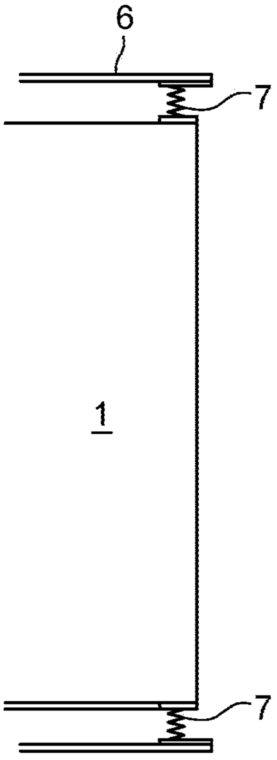
FIG. 4 is a side view of the elevator cabin with the first embodiment of the protective system according to the invention.

FIG. 2 shows a second embodiment of the protective frame 6. The protective frame 6 comprises a lateral protective frame arranged on the lateral side of the elevator cabin. The lateral protective frame comprises the top protective element and the bottom protective element. The lateral protective frame extends from (above the top edge) to (below) the bottom edge. The top protective element is arranged at the top of the lateral protective frame 6 and the bottom protective element at the bottom of the lateral protective frame 6. Preferably, the lateral protective frame comprises a plurality of lateral sub-frames arranged on different lateral sides of the elevator cabin. The different lateral sub-frames can be fixed independently (with distinct shock-absorbing sub-systems) to the elevator cabin. However, it is also possible that the different lateral sub-frames are structurally connected. For example in the embodiment shown in FIG. 2, the lateral protective frame comprises a first lateral protective frame arranged at the first lateral side, a second lateral protective frame arranged at the second lateral side, a third lateral protective frame arranged at the third lateral side and/or a fourth lateral protective frame arranged at the fourth lateral side.

If the elevator cabin comprises a cabin frame 5, the protective frame comprises preferably a first portion protective frame arranged on the first portion of the elevator cabin and a second portion protective frame arranged on the second portion of the elevator cabin. In the example of FIG. 1, the elevator cabin has then a first portion top protective frame arranged on the top side of the first portion of the elevator cabin, a first portion bottom protective frame arranged on the bottom side of the first portion of the elevator cabin, a second portion top protective frame arranged on the top side of the second portion of the elevator cabin and a second portion bottom protective frame arranged on the bottom side of the second portion of the elevator cabin. In the example of FIG. 2, the second lateral protective frame would then have a first portion second lateral protective frame arranged on the first portion of the second lateral side and a second portion second lateral protective frame arranged on the second portion of the second lateral side (not shown). Equally, the fourth lateral protective frame would then have a first portion fourth lateral protective frame arranged on the first portion of the fourth lateral side (not shown) and a second portion fourth lateral protective frame arranged on the second portion of the fourth lateral side (not shown).

In a preferred embodiment, the top protective element protects more than 50%, preferably more than 60%, preferably more than 70%, preferably more than 80%, preferably more than 90%, preferably more than 95%, preferably 100% of the (peripheral) top edge of the elevator cabin. This means that the top protective element extends along the respective percentage of the top edge. In a preferred embodiment, the bottom protective element protects more than 50%, preferably more than 60%, preferably more than 70%, preferably more than 80%, preferably more than 90%, preferably more than 95%, preferably 100% of the (peripheral) bottom edge of the elevator cabin. This means that the top protective element extends along the respective percentage of the bottom edge.

In an alternative embodiment, the top protective element extends (only or at least) along the complete risk top edge, and the bottom protective element extends (only or at least) along the complete risk bottom edge. The risk (top/bottom) edge is defined as the part of the (top/bottom) edge passing an opening of the pathway of the elevator which allows to invade the pathway of the elevator from the outside.

The shock-absorbing system 7 can be realized by one or a plurality of springs as shown in the Figures. Here, the protective frame (or each protective sub-frame) is connected via four (helical) springs. However, any other shock-absorbing means like a hydraulic damper or other can be used as shock-absorbing system 7. The shock-absorbing system 7 comprises preferably a plurality of shock-absorbing subsystems for the plurality of sub-frames, respectively. The shock-absorbing system 7 is preferably configured to allow an absorbing distance of at least 2 cm, preferably at least 3 cm, preferably at least 4 cm. The shock-absorbing distance is the absorbing distance the protective structure can move out of the operating position against the driving direction. In one embodiment, the shock-absorbing distance is chosen at least as long as the distance necessary to stop the elevator cabin. This can be achieved by tailoring the absorbing distance to the speed of the elevator or by regulating the speed or the stop distance in the elevator control unit controlling the elevator motor.

The collision detector is configured to detecting when the protective structure 6 is moved out of its operating position to detect a collision. This can be for example realized by a mechanical switch which is activated, when the protective structure moves towards the elevator cabin. However, any other detector for detecting that the protective structure is moved out of its operation position is possible to detect a collision.

The protective system comprises preferably further an electronic detector 10 configured to detect a penetration of an object through the surface spanned between the top edge and the bottom edge. This surface provides the lateral envelop of the elevator cabin so that the electronic detector 10 protects the lateral envelop of the elevator cabin from its penetration by an object. The object can come from the inside of the elevator cabin or from outside of the pathway. The electronic detector is based preferably on the emission of electromagnetic waves. The radiation frequency can be in the spectrum of the visible light, infrared light, radar, etc. The electronic detector 10 comprises preferably a detector unit and a counter detector unit. The detector unit emits preferably the electromagnetic waves. The electromagnetic waves are preferably emitted such that they do principally extend in the detection surface. The counter detector unit is preferably a detector for detecting the emitted electromagnetic waves or a reflector for reflecting the emitted electromagnetic waves back to the detector unit. In the latter case, the detector unit comprises also a detector for detecting the reflected electromagnetic waves. The electronic detector 10 can for example be a light curtain. In one embodiment, the electronic detector 10 extends along the top edge and the bottom edge to emit and/or detect the electronic waves along the (complete) top/bottom edge to emit the electromagnetic waves over the full surface spanned between the top and bottom edge. The detector unit extends along one of the top edge and the bottom edge, while the counter detector unit extends along the other one of the top edge and the bottom edge. In an alternative embodiment, it is also possible to arrange the electronic detector, the detector unit and/or the counter detector unit along lateral edges, wherein the lateral edges are formed by the edges between two neighboring lateral sides. The electronic detector 10 must be distinguished from the inner electronic detector. While the electronic detector 10 provides a protection from objects entering in the pathway of the elevator from the outside of the elevator, the inner electronic detector protects against objects approaching the entrance of the elevator cabin from the inside.

Figure 5:
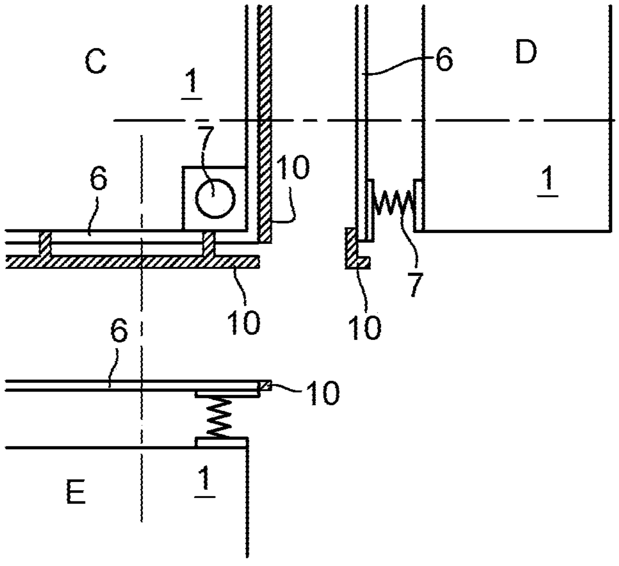
FIG. 5 is a mixed top and side view of the elevator cabin with the first embodiment of the protective system according to the invention showing the electronic detector.

In a preferred embodiment, the electronic detector 10 is arranged on the protective structure and is configured to detect a penetration of an object through the surface spanned between the top protective element and the bottom protective element. By arranging the electronic detector 10 on the protective structure, the installation complexity is reduced because just the protective structure with the shock-absorbing system must be installed on the elevator cabin. In addition, the detection from the top protective element to the bottom protective element completes the full protection envelope of the elevator cabin. The top protective element protects the top side of the elevator cabin. The bottom protective element protects the bottom side of the elevator cabin and the electronic detector 10 the lateral envelope around the elevator cabin. FIG. 5 shows an example, in which the electronic detector 10 or one of the detector unit and the counter detector unit is installed on the top protective element (extending along the top protective element) and the electronic detector 10 or the other one of the detector unit and the counter detector unit is installed on the bottom protective element (extending along the bottom protective element). The top/bottom protective element or at least the electronic detector 10 installed on them extends therefore beyond the peripheral top/bottom edge of the elevator cabin so that a line/surface of sight is created between the detector unit and the counter detector unit on the top and bottom protective element. Like this, an electronic "curtain" or envelop is created around the elevator cabin which detects any penetration of this curtain/envelop. It is however also possible to arrange the electronic detector along the lateral frame elements of the lateral protective frame of FIG. 2 so that the electronic curtain is spanned in between the lateral frame elements extending from the top edge or top protective element to the bottom edge or bottom protective element.

It should be understood that the present invention is not limited to the described embodiments and that variations can be applied without going outside of the scope of the claims.

1 Cabin
2 Pathway guide rails
3 Toe guard
4 Grill gate
5 Cabin frame
6 Protective structure/frame
7 Shock-absorber
9 cabin guide rails
10 electronic detector
12 counter weight

The invention claimed is:

1. A movable element of an elevator like an elevator cabin or a counterweight, wherein the movable element comprises:

a top side, a bottom side, a lateral side, a top edge between the lateral side and the top side, a bottom edge between the lateral side and the bottom side, a protective structure connected to the movable element via a shock-absorbing system holding the protective structure in an operating position and allowing the protective structure to move against the driving direction of the movable element, when the protective structure hits an object during driving of the elevator, wherein the protective structure has a top protective element which in the operating position is arranged above the top edge and is extending along the top edge, wherein the protective structure has a bottom protective element which in the operating position is arranged below the bottom edge and is extending along the bottom edge, a collision detector for detecting when the top protective element or the bottom protective element is moved out of the operating position of the protective structure to detect a collision, wherein the collision detector is configured to initiate the stop of the movable element during drive of the movable element, when the collision is detected, wherein the protective structure is designed to allow a person to stand on the top side of the movable element without moving the protective structure out of its operating position, wherein the movable element comprises an electronic detector configured to detect a penetration of an object through the surface spanned between the top edge and the bottom edge.

2. The movable element according to claim 1, wherein the electronic detector is arranged on the protective structure and is configured to detect a penetration of an object through the surface spanned between the top protective element and the bottom protective element.

3. The movable element according to claim 2, wherein an emitter of the light curtain is arranged along one of the top and bottom protective elements and a receiver or reflector is arranged on the other one of the top and bottom protective elements.

4. The movable element according to claim 1, wherein the movable element is an elevator cabin, wherein the elevator cabin comprises a cabin frame extending in the center of the cabin around the cabin and having an attachment means for attaching the elevator cabin to an elevator cable or to an hydraulic piston and for holding the cabin box configured to carry the passengers or other weight charge, wherein the cabin frame separates the elevator cabin in a first portion with a first portion lateral side, a first portion top side, a first portion bottom side, a first portion top edge and a first portion bottom edge and in a second portion with second portion lateral side, a second portion top side, a second portion bottom side, a second portion top edge and a second portion bottom edge, wherein the protective structure comprises a first portion protective structure and a second portion protective structure, wherein the first portion protective structure connected to the elevator cabin via a first portion shock-absorbing system holding the first portion protective structure in a first portion operating position and allowing the first portion protective structure to move against the driving direction of the elevator cabin, when the first portion protective structure hits an object during driving of the elevator cabin, wherein the first portion protective structure has a first portion top protective element which in the operating position is arranged above the first portion top edge and is extending along the first portion top edge, wherein the first portion protective structure has a first portion bottom protective element which in the first portion operating position is arranged below the first portion bottom edge and is extending along the first portion bottom edge, wherein the second portion protective structure connected to the elevator cabin via a second portion shock-absorbing system holding the second portion protective structure in a second portion operating position and allowing the second portion protective structure to move against the driving direction of the elevator cabin, when the second portion protective structure hits an object during driving of the elevator cabin, wherein the second portion protective structure has a second portion top protective element which in the operating position is arranged above the second portion top edge and is extending along the second portion top edge, wherein the second portion protective structure has a second portion bottom protective element which in the second portion operating position is arranged below the second portion bottom edge and is extending along the second portion bottom edge.

5. The movable element according to claim 1, wherein the protective structure comprises a top protective structure arranged on the top side and a bottom protective structure arranged on the bottom side, wherein the top protective structure is connected to the movable element via a top shock-absorbing system holding the top protective structure in a top operating position and allowing the top protective structure to move against the driving direction of the movable element, when the top protective structure hits an object during driving of the movable element, wherein the top protective structure comprises the top protective element, wherein the bottom protective structure is connected to the movable element via a bottom shock-absorber system holding the bottom protective structure in a bottom operating position and allowing the bottom protective structure to move against the driving direction of the movable element, when the bottom protective structure hits an object during driving of the movable element, wherein the bottom protective structure comprises the bottom protective element.

6. The movable element according to claim 1, wherein the protective structure comprises a lateral protective structure arranged on the lateral side, wherein the lateral protective structure comprises the top protective element and the bottom protective element.

7. The movable element according to claim 1, wherein the shock-absorbing system and the protective structure is configured that the protective structure can move upon collision with an object an absorbing distance against the movement direction of the movable element, wherein the absorbing distance is at least 2 cm.

8. The movable element according to claim 1, wherein the top protective element has a frame width smaller than 10 cm, wherein the frame width is the dimension of the top protective element perpendicular to the driving direction and perpendicular to the top edge, and/or wherein the bottom protective element has a frame width smaller than 10 cm, wherein the frame width is the dimension of the bottom protective element perpendicular to the driving direction and perpendicular to the bottom edge.

9. An elevator comprising:

the movable element of claim 1, the movable element being an elevator cabin; and an elevator pathway in which the elevator cabin can move up and down, the elevator pathway including at least one opening through which an object can enter in the elevator pathway and collide with the elevator cabin, wherein a risk top edge is a part of the top edge passing the at least one opening during movement of the elevator cabin, and a risk bottom edge is a part of the bottom edge passing the at least one opening during movement of the elevator cabin, wherein the top protective element extends along the risk top edge, wherein the bottom protective element extends along the risk bottom edge.

10. The elevator according to claim 9, wherein the protective structure is a first protective structure, the shock-absorbing system is a first shock-absorbing system, and the collision detector is a first collision detector, the elevator comprising:

a counter weight, wherein the counter weight comprises:

a top side, a bottom side, a lateral side, and a top edge between the lateral side and the top side and a bottom edge between the lateral side and the bottom side, a second protective structure and a second shock-absorbing system, wherein the second protective structure is connected to the counter weight via the second shock-absorbing system holding the second protective structure in an operating position and allowing the second protective structure to move against the driving direction of the counter weight, when the second protective structure hits an object during driving of the elevator, wherein the second protective structure has a top protective element which in the operating position is arranged above the top edge of the counter weight and is extending along the top edge of the counter weight, wherein the second protective structure has a bottom protective element which in the operating position is arranged below the bottom edge of the counter weight and is extending along the bottom edge of the counter weight, and a second collision detector for detecting when the second protective structure is moved out of the operating position to detect a collision.

11. The elevator according to claim 9, wherein the shock-absorbing system of the elevator cabin is configured such that the protective structure can move upon collision with an object at least an absorbing distance against the movement direction of the elevator cabin, wherein the absorbing distance is longer than a distance required to stop the elevator cabin, when the collision is detected with the collision detector of the elevator cabin.

12. A system for protecting a movable element of an elevator, wherein the movable element comprises a top side, a bottom side, a lateral side, a top edge between the lateral side and the top side and a bottom edge between the lateral side and the bottom side, the system comprising:

a protective structure;

a shock-absorbing system, and a collision detector, wherein the protective structure is connected to the movable element via the shock-absorbing system holding the protective structure in an operating position and allowing the protective structure to move against the driving direction of the movable element, when the protective structure hits an object during driving of the elevator, wherein the protective structure has a top protective element which in the operating position is arranged above the top edge and is extending along the top edge, wherein the protective structure has a bottom protective element which in the operating position is arranged below the bottom edge and is extending along the bottom edge, wherein the collision detector is to detect when the top protective element or the bottom protective element structure is moved out of the operating position of the protective structure to detect a collision, wherein the protective structure is designed such that the top protective element extends along the top edge and the protective structure comprises a recess from the top protective element towards the central region of the top side to access the top side, wherein the movable element comprises an electronic detector configured to detect a penetration of an object through the surface spanned between the top edge and the bottom edge.

13. A method for retrofitting an elevator with a system according to claim 12.

* * * * *